INVENTOR.
Mathew J. Vincent

INVENTOR.
Mathew J. Vincent

2,994,819
ELECTRICAL POWER TOOL TESTER
Matthew J. Vincent, 405 W. J St., Benicia, Calif.
Filed June 23, 1959, Ser. No. 822,395
1 Claim. (Cl. 324—51)
(Granted under Title 35, U.S. Code (1952), sec. 266)

The invention described herein may be manufactured and used by or for the Government for governmental purposes without the payment to me of any royalty thereon.

This invention relates to an electric power tool tester and more particularly to a tester for determining the condition of electrically powered tools, extension cords and power outlets in regards to their serviceability.

In many States, effective grounding of portable power tools is required and it is necessary, therefore, that these tools be regularly tested in order to properly maintain their safe use.

The present invention provides a tester to provide a simple and reliable test on portable and semi-fixed electrical tools and on attachment-plug power receptacles of the single phase, three-wire, 110 volt systems.

The device comprises a metal box in which is contained the necessary electrical wiring. In the box lid are a pair of switches, a pair of outlet receptacles for different size attachment plugs to fit in, a pair of indicator lights, and a binding post. A ground clamp and a three-wire outlet completes the assembly.

The device is higly portable and easy to use.

It is therefore a primary object of this invention to provide a portable testing device for testing the condition of electrically powered tools and power outlets for safe use with respect to the proper grounding or shorts in the tool or outlet.

It is another object to provide a device having a series of indicating lights and operating switches for indicating malfunction or the absence of a ground in an electrical appliance or power outlet.

It is a further object to provide a portable testing device for use on portable and semi-fixed electrical tools and on attachment plug power receptacles in a single phase three-wire 110 volt system.

A further object is to provide a testing device that will not operate unless the power receptacle being tested is grounded.

A final object is to provide a testing device that is reliable in operation and easy to operate.

The invention will be best understood from a consideration of the following detailed description taken in connection with the accompanying drawing, it being understood however, that the invention is not limited by the specific illustration or description but that such illustration and description constitute a preferred embodiment of the invention.

Figure 1:
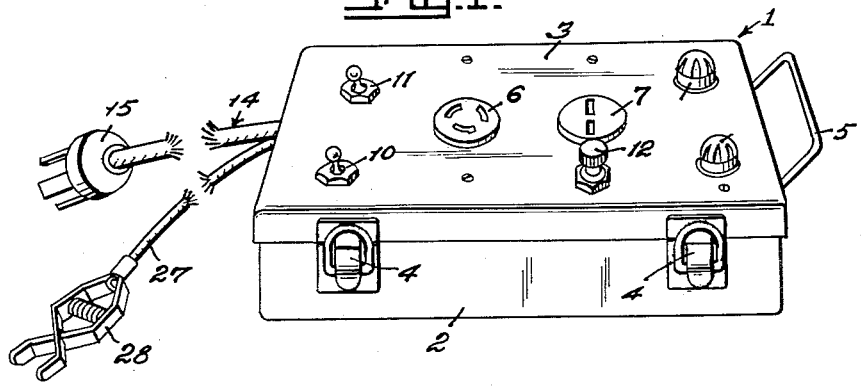
FIG. 1 is a perspective view of the portable testing device.
Figure 2:
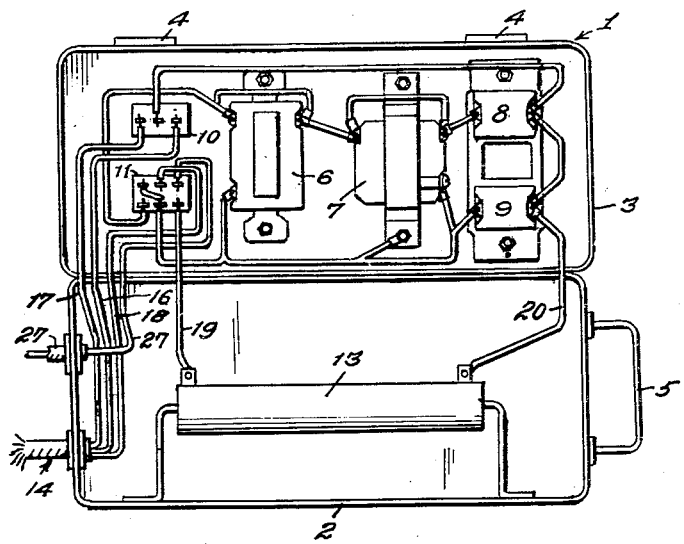
FIG. 2 is a top plan view of the device, the box being opened.

Referring now to the drawings in detail, 1 represents generally, the testing device in its entirety and consists of a box having a bottom 2 and a lid 3. Hasps 4 are provided to lock the box and a handle 5 for carrying the box is provided at one end thereof.

The indicating and operating elements of the tester are housed in the lid 3 of the box, while the bottom 2 contains elements which are fixed and also provides space for wires, etc.

Figure 4:
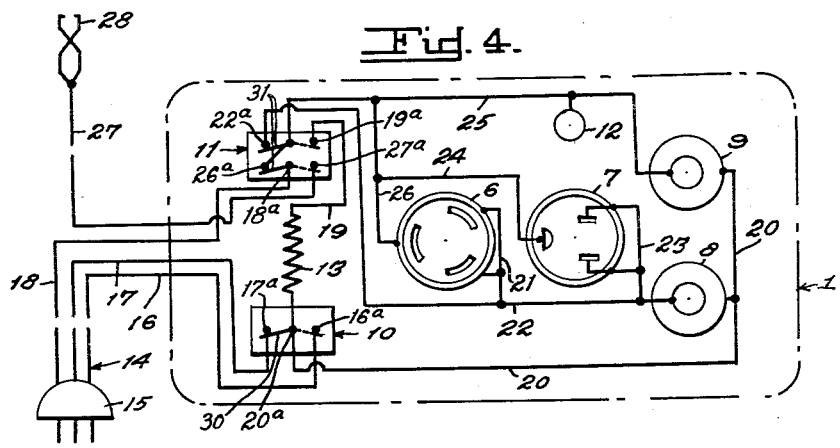
FIG. 4 is a similar view in which two receptacles are used.

The electrical components of the tester employing two receptacles are best seen in the wiring diagram of FIG. 4 in which two outlets 6 and 7 are provided for receiving plugs with differently shaped prongs. Two indicator lights neon 8 and filament 9, two toggle switches 10 and 11, connector plug 12 and a resistor 13 comprise the electrical components in the box.

Electrical connection between the elements comprises a three wire cable, generally indicated as at 14 and is attached at its outer end to a plug 15 for inserting in receptacles, etc.

The electric wiring of the device is as follows:

Cable 14 contains a first lead 16 connecting plug 15 to a terminal 16a on switch 10, a second lead 17 connecting plug 15 to a terminal 17a on switch 10, and a third lead 18 connecting plug 15 to a terminal 18a on switch 11.

A lead 19 connects a terminal 19a on switch 11, through resistance element 13 and to a terminal 20a on switch 10.

A wire 20 connects terminal 20a, neon light 8 and filament light 9, while a wire 25 connects light 9 to a terminal 26a on switch 11.

A binding post 12 is connected to wire 25.

Neon light 8 is connected by a wire 22 to a terminal 22a on switch 11.

Receptacle 7 (FIG. 3) is connected by a connection 26 to wire 25 and is shorted by connection 23 to wire 22. In FIG. 4, outlet 6 is shorted by connection 21 to wire 22 and is connected by connection 26 to wire 25, while receptacle 7 is connected by wire 24 to connection 26.

A grounding clip 28 is connected by a lead 27 to a terminal 27a on switch 11.

The outlets are purposely shorted in order to utilize one indicator light only in indicating a short on either lead 16 or 17 of cord 14.

Switch 10 is provided with a contact arm 30 which is operable in one position to connect terminal 20a with terminal 17a, or in another position to connect terminal 20a with terminal 16a.

Switch 11 is provided with a double contact arm 31 which is operable in one position to connect terminal 18a with terminals 26a and 22a, or in another position to connect terminals 18a and 26a with terminals 19a and 27a respectively.

The position of the switches 10 and 11 is the same for all tests except when testing extension cords. Switch 10 will be either in left or right position depending on the polarity of the power supplying receptacle. When polarity is correct, both lights 8 and 9 should be "on" when switch 10 is in the "left" position and switch 11 is normally at rest. Switch 11 being of the momentary (spring-loaded) type, will be normally at rest in the "left" position. It must be fully depressed to the "right" position to perform the test except when it is desired to test an extension cord. Then both switches 10 and 11 should be left in their normal "left" positions (with both lights 8 and 9 on). The tester is disconnected from the power supplying receptacle and the extension cord is inserted between the tester appliance cord 14 and power supplying receptacle (not shown). No change in lights indicates that the extension cord is properly wired.

*Operation*

When testing a power receptacle not shown (floor plug or the like), connect plug 15 to the wall plug, etc., and turn switch 10 to "right" position. This turns the tester "on" causing both lights 8 and 9 to burn. The tester is now ready for test. If both lights burn only when switch 10 is in "right" position, the polarity of the power receptacle is reversed. If both lights 8 and 9 do not burn with switch 10 in either position, the power receptacle lacks the required ground or is otherwise defective. The tester will not operate on an ungrounded receptacle.

When the tester is used for testing an electrical appliance such as a portable or semi-fixed tool (not shown) for effective grounding, the alligator clip 28 is attached to the housing of the appliance and plug 15 is inserted in a power outlet such as a wall plug.

The plug on the extension cord of the appliance (not shown) is inserted into outlet 6 or 7 whichever fits the plug of the cord and contact arm 30 of switch 10 is turned to the right to contact terminal 16a.

Contact arm 31 of switch 11 is turned to the right to connect terminals 26a and 18a with terminals 19a and 27a respectively.

If light 9 is on and light 8 is off the appliance is indicated to be in a serviceable condition.

Should light 8 be on and light 9 be off, then the appliance is indicated to be in an unserviceable condition such as a broken ground wire.

Figure 3:
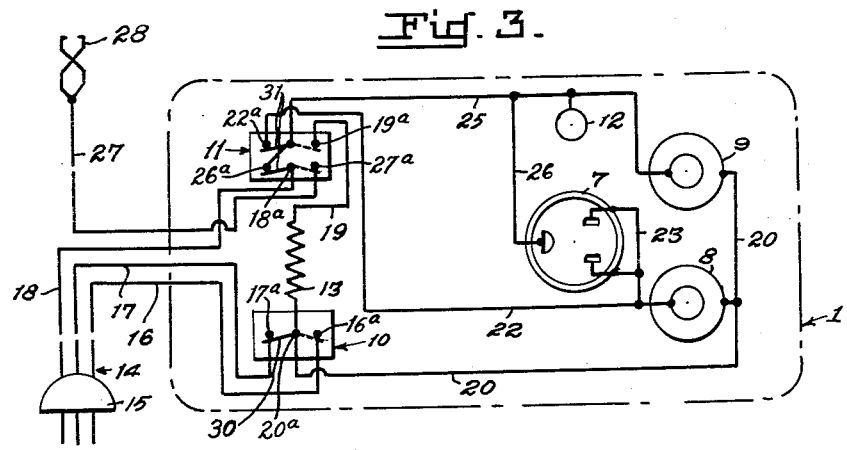
FIG. 3 is a wiring diagram of the testing device in which only one receptacle is used.

The flow of current in the tester, when the appliance tested is in a serviceable condition and using the hook-up shown in FIG. 3 for simplicity, will be as follows: lead 16 in cable 14 to terminal 16a on switch 10, terminal 20a, wire 20, light 9, wire 25 to terminal 26a of switch 11, terminal 19a, lead 19, resistor 13 and to terminal 20a of switch 10, lead 18 in cable 14 to terminal 18a of switch 11, terminal 27a, lead 27 to alligator clip 28, through appliance (not shown) and to receptacle 7, connector 26 and to wire 25.

The flow of current in the tester when the appliance (not shown) tested is in an unserviceable condition, and using the hook-up of FIG. 3 for simplicity, will be as follows: lead 16 in cable 14 from plug 15 to terminal 16a of switch 10, terminal 20a of switch 10, wire 20, light 8, connection 23, receptacle 7, through appliance (not shown) tested, alligator clip 28, lead 27 to terminal 27a of switch 11, terminal 18a, lead 18 in cable 14 to plug 15.

The resistor 13 is in parallel with the filament of the lights 8 and 9 and without a resistor, a true indication of the "ground" would not be possible without substituting an ohmmeter.

The binder post 12 is used only when the appliance (not shown) to be tested is equipped with two-pronged plugs having grounding "pigtails," or a third wire (not shown) which is connected to binding post 12 in lieu of clip 28 to ground the appliance and prevent the user from receiving an electric shock.

From the foregoing, it is apparent that an efficient electrical appliance tester has been devised that will perform simple and reliable tests on portable and semi-fixed electrical tools and attachment-plug power receptacles of single phase, 3-wire 110 volt systems. The device of the invention requires but a few minutes instruction in operation and requires no electrical experience to operate.

It is to be understood that the form of the invention herein shown and described, is to be taken as a preferred example of the same, and that various changes in the shape, size and arrangement of parts may be resorted to without departing from the spirit of the invention as set forth in the appended claim.

What is claimed is:

A tester for electrical appliances, comprising a manually operated, single throw switch in said tester for operating said tester when testing the polarity of an electrical receptacle, said single throw switch having first, second and third terminals, a single contact arm on said single throw switch, operable, in one position, to connect said third terminal with said second terminal on said single throw switch, and in another position, to connect said third terminal with said first terminal on said single throw switch, a second manually operated, double throw switch in said tester for operating said tester when testing an electric appliance for short circuits, said double throw switch having first, second, third, fourth and fifth terminals, a double contact arm on said double throw switch, operable, in one position to connect said fifth terminal with said second and first terminals on said double throw switch, or in another position to connect said fifth and said second terminals with said third and fourth terminals respectively on said double throw switch, an inlet cable leading from said tester for connecting said tester to an electric source when operating, said cable carrying first, second and third leads, said first lead being connected to said first terminal on said single throw switch, said second lead in said cable being connected to said second terminal on said single throw switch and said third lead being connected to said fifth terminal on said double throw switch, a resistor element electrically connected between said third terminal on said single throw switch and said third terminal on said double throw switch, first and second indicator lights in said tester, electric circuitry connecting said lights in parallel with said single throw and said double throw switches comprising a first wire connecting said first and second lights and said third terminal on said single throw switch, a second wire connecting said second light to said second terminal on said double throw switch and a third wire connecting said first light to said first terminal on said double throw switch, at least one electrical receptacle for the attachment therein of an electrical appliance cord when being tested, said receptacle being disposed between said second and third wires, electrical circuitry connecting said receptacle to said second and third wires comprising a first connection between said receptacle and said third wire, a second connection between said receptacle and said second wire, a grounding clip leading from said tester for attachment to an electric appliance casing when being tested, said clip being connected to said fourth terminal on said double throw switch, and a grounding binding post connected to said second wire for the attachment of a third ground wire of the electrical appliance, when present, in lieu of said grounding clip.

References Cited in the file of this patent

UNITED STATES PATENTS

| | | |
|---|---|---|
| 2,442,771 | Kirkpatrick | June 8, 1948 |
| 2,806,993 | Matousek | Sept. 17, 1957 |
| 2,858,507 | Liautaud et al. | Oct. 28, 1958 |